United States Patent [19]

Gaudin

[11] Patent Number: 4,847,967
[45] Date of Patent: Jul. 18, 1989

[54] PROCESS FOR THE REPAIR BY LINING OR A STEAM-GENERATOR TUBE AND A REPAIR LINING FOR THIS TUBE

[75] Inventor: Jean-Paul Gaudin, Chassieo, France
[73] Assignee: Framatome, Courbevoie, France
[21] Appl. No.: 795,595
[22] Filed: Nov. 6, 1985
[30] Foreign Application Priority Data
   Nov. 6, 1984 [FR] France ................ 84 16880
[51] Int. Cl.⁴ ............... B21D 39/00; B21K 29/00
[52] U.S. Cl. .................... 29/157.4; 29/402.16;
   29/523; 228/173.2; 228/119; 376/260; 165/76
[58] Field of Search ........... 376/260; 228/119, 173.2,
   228/173.3, 165, 168; 138/97; 29/157.4, 523,
   402.16; 165/76

[56] References Cited
U.S. PATENT DOCUMENTS 3,683,658  8/1972  Roeschlaub ............... 29/523 X
4,368,571  1/1983  Cooper, Jr. ............... 29/523 X
4,448,343  5/1984  Kochka et al. ............ 228/119 X
4,592,577  6/1986  Ayres et al. .............. 285/287

OTHER PUBLICATIONS

Olds, F. C. "Sleeving Saves Nuclear Steam Generator Tubes", *Power Engineering*, Dec. 1981, pp. 73-75.

*Primary Examiner*—John S. Maples
*Attorney, Agent, or Firm*—Pollock, Vande Sande & Priddy

[57] ABSTRACT

A process for the repair by lining of a tube (12) of a steam generator, and a lining for such repair. The lining (15) is introduced into the tube (12), is rolled in the tube (12) inside the tube plate (11) and radially expanded through rolling of its end part (18) located in the tube (12) outside the tube plate (11). Leak-proofing is ensured by brazing the end part (18) of the lining in the tube (12). In its end zone (18), the lining (15) has slots filled with brazing metal and grooves coaxial with the lining (15), which make it easier for the brazing metal to spread. The invention applies particularly to the steam generators of pressurized water nuclear reactors.

1 Claim, 2 Drawing Sheets

PROCESS FOR THE REPAIR BY LINING OR A STEAM-GENERATOR TUBE AND A REPAIR LINING FOR THIS TUBE

FIELD OF THE INVENTION

The invention relates to a process for the repair by lining of a tube of a steam generator and to a repair lining for this tube.

BACKGROUND OF THE INVENTION

Steam generators of pressurized water nuclear reactors comprise a bundle of tubes, the ends of which are swaged in a very thick tube plate. The primary water of the reactor, at high pressure and at high temperature, which comes into contact with the fuel assemblies of the core, circulates within the tubes of the bundle so as to heat and vaporize the supply water, brought into contact with the outer wall of the tubes, inside the casing of the steam generator.

The tubes of the bundle are flush with one of the faces of the plate, called the inlet face, via which the primary water enters the bundle and leaves it again in two separate zones, and emerge from this tube plate so as to penetrate into the casing of the bundle via its other, outlet face.

The wall of the tubes of the bundle therefore constitutes a barrier between the primary fluid containing radioactive products and the supply water to be vaporized, the steam of which is conveyed to the turbine associated with the nuclear reactor. It is therefore necessary as far as possible to prevent a leak from occurring in the tubes of the steam-generator bundle and to repair the tubes efficiently and as quickly as possible when their wall is perforated.

Because of the temperature gradients, mechanical stresses attributed to the pressure differences and to the different forms of corrosion can arise in the steam generator, both on the primary side and on the secondary side, during the use of the steam generator, the service life of which must be equal to that of the other parts of the reactor, and tube perforations which produce leaks can occur and require repair during reactor maintenance periods.

To date, one of the techniques used most often has been to render the defective tube inoperative by means of a plug fastened to the end of the tube adjacent to the inlet face of the tube plate, in its part receiving the primary water coming from the reactor core. This known technique has a reasonably high degree of reliability, but a disadvantage is that the exchange surface of the steam generator is reduced, all the more since a larger number of tubes of the bundle will have had to be put out of action.

Processes for repairing the tubes of the bundle of a steam generator by lining these tubes at the location of the defect causing a loss of leak-proofing capacity have therefore been conceived. In these, a tubular lining having an outside diameter a little less than the inside diameter of the tube to be repaired and sufficient length to cover the defect is introduced into the tube via the inlet face of the tube plate and is placed on this tube plate and in the tube so as to be flush with the inlet face. This lining is subsequently secured by diametrical expansion inside the tube.

It has been proposed, for example, to carry out this expansion by means of a hydraulic mandrel, but the mechanical strength and leak-proofing of the repaired tube have proved inadequate.

It has also been proposed to improve the fastening of the lining by swaging it inside the tube. Swaging results in a rolling of the lining within the tube and therefore in a reduction in its thickness. However, such a swaging operation to fasten the lining with sufficient strength is only possible in the part of the tube located inside the tube plate.

It has therefore been proposed to weld the lining to the inside of the tube after it has been expanded hydraulically. However, the welding temperatures with or without a filler metal make it necessary to operate in a protected environment, and this complicates the repair operations on the tubes. Consequently, it is usually preferable to fasten the lining in the tube by brazing, after the former has been deformed by hydraulic pressure.

The end of the lining flush with the inlet face of the tube plate is therefore fastened inside the tube by swaging within the tube plate, and the connection is made leak-proof by a weld at the end of the tube and the lining.

The lining is then explained radially inside the tube by hydraulic means in a second zone of this lining outside the tube plate. Fastening is completed by fusion of a brazing material previously introduced between the outer surface of the lining and the inner surface of the tube in the zone undergoing hydraulic expansion.

Such a process makes it possible to ensure satisfactory mechanical fastening of the lining within the tube, but it has been noticed that the tube and the lining undergoes increased corrosion above the zone of the junction made by means of hydraulic expansion and brazing. This increased corrosion can be linked to the presence of a gap between the tube and the lining in the end part of the tube opposite its end swaged in the tube plate. In fact, it is not possible to carry out hydraluic expansion up to the end part of the tube, since it is necessary, in this part, to ensure satisfactory leak-proofing of the expansion chamber of the inner wall of the lining.

When a mandrel with a deformable wall is used, it is also necessary to place this mandrel at a certain distance from the upper end of the lining inside the tube.

In all cases, therefore, there is a dead zone of a certain length, in which radial expansion of the lining within the tube does not take place. This results in an annular gap between the lining and the tube, within which corrosion products or radioactive products are deposited, and these impair the operating conditions and lower the corrosion resistance of the tube.

The importance of this dead zone in the end part of the tube had been underestimated up to then, and the main aim had been to make a mechanically strong connection between the lining and the tube.

SUMMARY OF THE INVENTION

The object of the invention is, therefore, to propose a process for the repair by lining of a tube of a steam generator comprising a bundle of tubes and a tube plate, in which the tubes of the bundle are swaged from the inlet face of the tube plate, with which the ends of the tubes are flush, up to the outlet face, via which the tubes penetrate into the body of the steam generator, this process involving introducing into the tube to be repaired, from the inlet face of the tube plate, a tubular lining having an outside diameter a little less than the inside diameter of the tube and a length designed for the repair to be carried out, fastening the lining by the swaging in the tube in a first zone near its end, in the vicinity of the inlet face of the tube plate, and fastening the lining in the tube in a second zone outside the tube plate by radial expansion followed by brazing of the outer surface of the lining on the inner surface of the tube, this repair process making it possible to obtain a fastening with high mechanical strength, without producing a zone promoting the deposit of radioactive products or corrosion products inside the tube.

For this purpose, the radial expansion of the lining is carried out by swaging in its end part opposite the swaged end of the tube plate, so that the lining undergoes plastic deformation and the tube undergoes elastic deformation only, and brazing is carried out by melting brazing metal previously deposited on the outer surface of the lining in its end part.

The invention also relates to a lining for the repair of a steam-generator tube, having a deposit of brazing metal in at least one zone of its outer surface in the vicinity of its end part, and at least one zone in the immediate vicinity of its end part having grooves machined in the outer surface of the lining and coaxial relative to this lining.

BRIEF DESCRIPTION OF THE DRAWINGS

In order that the invention may be more clearly understood, it will now be described with reference to the attached drawings, showing a repair operation carried out on a tube of a steam generator of a pressurized water nuclear reactor by means of lining, using both a process according to the state of the art and the process according to the invention, and of the means used during the operation carried out by means of the process according to the invention.

DESCRIPTION OF PREFERRED EMBODIMENT

Figures 1, 2:
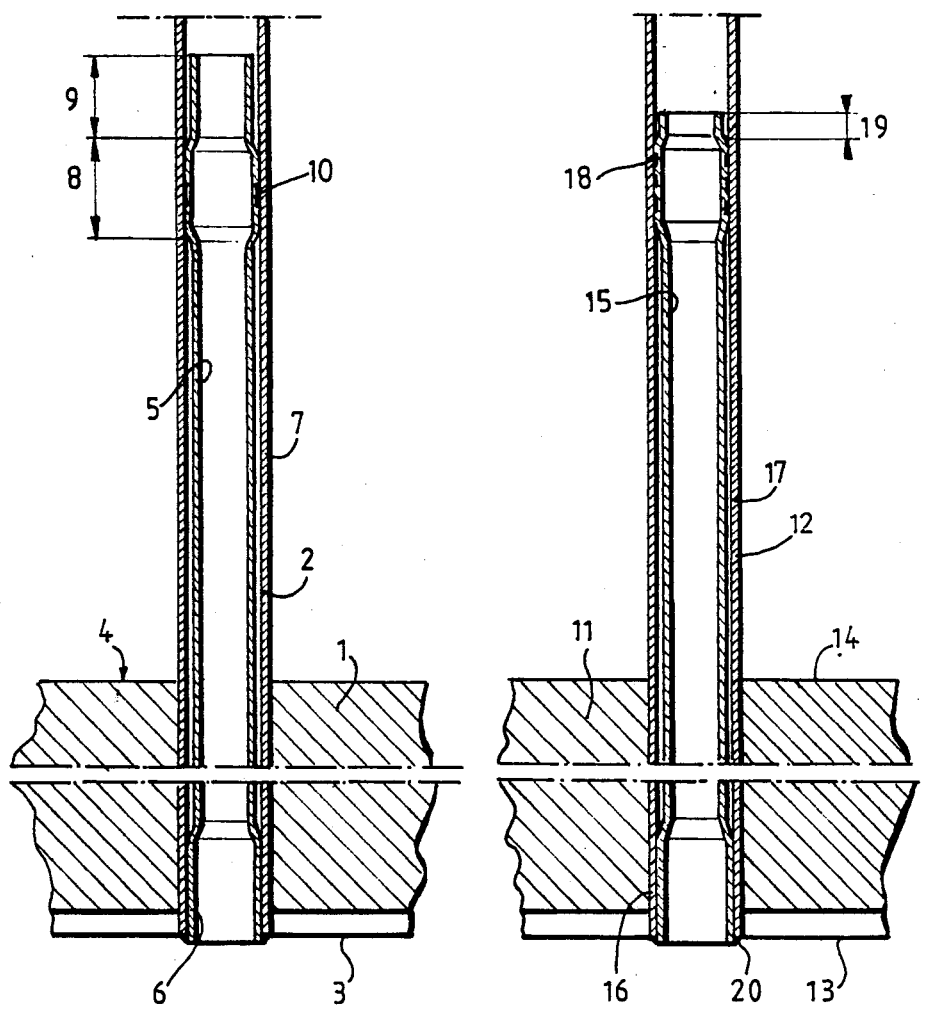
FIG. 1 is a sectional view, taken in a plane of symmetry, of part of the tube plate and a tube, within which a repair by lining is carried out by means of a process according to the prior art
FIG. 2 is a sectional view, taken in a plane of symmetry, similar to the view of FIG. 1, relating to the lining process according to the invention

FIG. 1 shows a tube plate 1 of great thickness (of the order of 0.60 m), within which a tube 2 is swaged over the entire thickness of the tube plate between its inlet face 3 and its outlet face 4. The outside diameter of the tube and the diameter of the orifice passing through the tube plate, within which this tube is swaged, are of the order of 0.022 m. The inside diameter of the tube is of the order of 0.020 m.

After the steam generator had been operating for a certain length of time, the tube 2 showed a small crack 7 in its part outside the tube plate 1. A repair was therefore carried out by means of a lining 5, the nominal outside diameter of which is 0.01905 m and the inside diameter of which is 0.0168 m.

The lining 5 is introduced into the tube up to the moment when its lower part is flush with the lower part of the tube 2 at the inlet face 3 of the tube plate 1. Swaging of a part 6 of this end of the lining is then carried out in the tube within the tube plate 1. The effect of this swaging operation is to roll the wall of the lining and reroll the wall of the tube 2 within the tube plate 1.

Hydraulic expansion of the lining 5 is likewise carried out in a second zone 8 of this lining inside the tube, but outside the tube plate 1. There remains above the zone 8, up to the end of the lining 5 engaged in the tube 2, a dead zone 9 in which the tube and the lining form an annular gap between them.

The fastening of the lining 5 in the tube, carried out by the process belonging to the state of the art, is completed by the melting of a brazing metal 10 deposited on the outer surface of the lining 5 in the zone 8 undergoing hydraulic diametral expansion. During operation, the dead zone 9 is the site of intense corrosion and a nuclear activity greater than in the other parts of the steam generator. These two undesirable phenomena are attributable to the presence of the gap between the tube and the lining.

Figure 3:
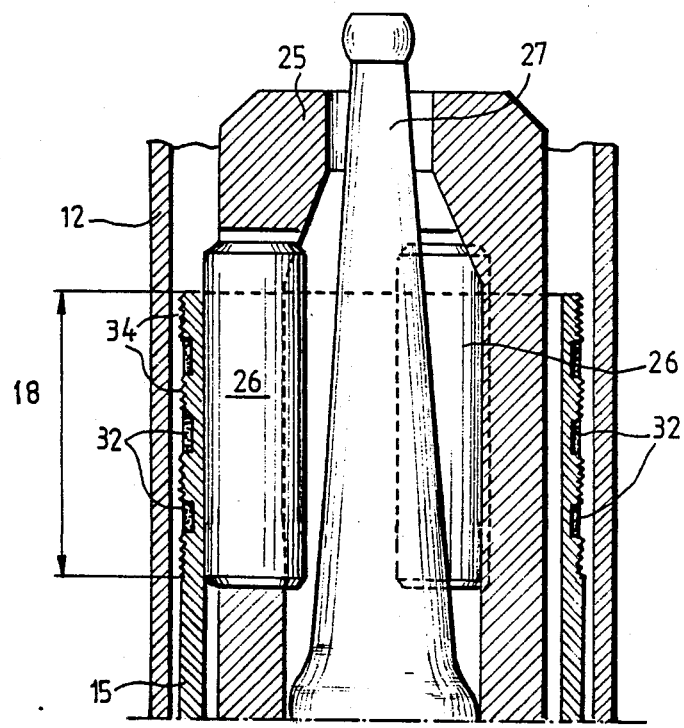
FIG. 3 is a sectional view showing the end part of the lining during swaging inside the tube

Reference will now be made to FIGS. 2 and 3 to describe an operation of lining a tube according to the process of the invention.

A tube 12 having an outside diameter of 0.0222 m is swaged in the tube plate 11 of a steam generator of a pressurized-water nuclear reactor between the inlet face 13 and the outlet face 14 of this tube plate of great thickness.

A crack 17 has appeared in the wall of the tube 12 during operation in the steam generator.

A repair is carried out by introducing a lining 15 into the tube 12 from the inlet face 13 of the tube plate, the inside diameter of the tube 12 and the outside diameter of the lining 15 being 0.01980 m and 0.01905 m, respectively.

The length of the lining 15 has been selected so that, when this lining is introduced into the tube, as shown in FIG. 2, the crack 17 is covered by this lining 15. The lower end of the lining 15 is flush with the lower end of the tube 12 which is itself practically flush with the inlet face 13 of the tube plate.

The lower part 16 of the lining 15 is then secured in the tube 12 by swaging. This swaging operation results in a rolling of the wall of the lining 15 and a rerolling of the wall of the tube 12. The leak-proofing of the tube at its end flush with the inlet face 13 of the tube plate is ensured by a weld 20.

Radial expansion of the end part 18 of the lining 15 is then carried out by means of a swaging operation such as that illustrated in FIG. 3.

FIG. 3 shows the end of the lining 15 inside the tube 12, the expander 25 comprising three rolling rolls 26, only one of which is shown in FIG. 3, being placed, in a working position, level with the said end. A conical rod 27 makes it possible to rotate the rolls 26 and push them outwards in a completely specific way. The advance of the rod 27 makes it possible to monitor precisely the radial expansion of the end of the lining 15. As can be seen in FIG. 3, the rolling rolls 26 are placed in position so as to project slightly in the axial direction in relation to the end of the lining 15.

The expansion of the lining 15 and the tube 12 during the ralling operation is adjusted so that, after the lining 15 has been brought into contact with the tube 12 as a result of radial expansion, the rolling is continued to obtain a very slight expansion of the tube 12, the deformation of which remains in the elastic region.

After the expander 25 has been removed, the tube 12 consequently retracts elastically in the radial direction, causing the end part 18 of the lining 15 to be clamped.

In this way, because of the slightly projecting position of the expander and because of an elastic recovery of the tube 12 to its original form, an expansion of the lining is obtained such that the dead zone 19 in the end part of this tube is of only a very short length above the deformed part of the end zone 18 of the lining 15.

Figure 4:
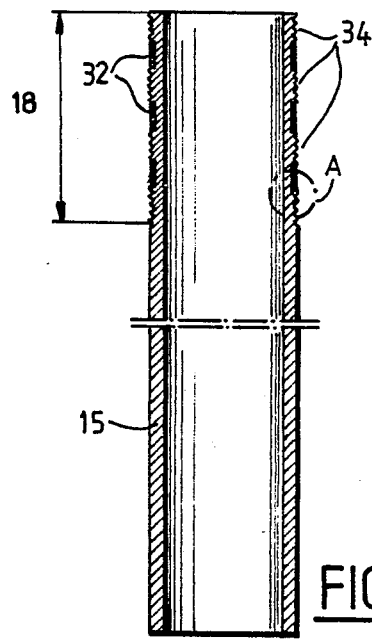
FIG. 4 is a sectional view, taken in an axial plane, of a lining used for repairing a steam-generator tube

As can be seen in FIGS. 3 and 4, the lining 15 has in its end part 18 three annular slots 32 coaxial with the lining 15 and fitted with brazing metal.

After the end parts 18 of the lining 15 has been expanded by means of swaging, an induction-heating means is placed inside the lining 15 in this zone 18, so as to heat the lining 15 and the brazing metal contained in the slots 32, until the melting of this brazing metal, which makes a leak-proof junction between the lining 15 and the tube 12.

Figure 5:
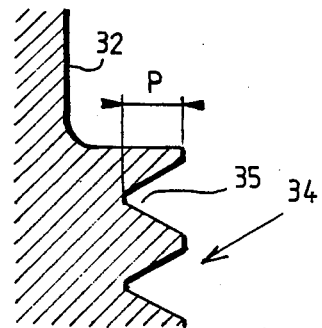
FIG. 5 is an enlarged view of detail A in FIG. 4.

With reference to FIGS. 4 and 5, it will be seen that the stores 32 are surrounded by zones 34, in which the outer surface of the lining is machined to form rotationally symmetrical grooves 35 about the axis of the lining and having a V-shaped profile, as can be seen in FIG. 5. These grooves have a depth P which is approximately equal to half the depth of the slots 32 filled with brazing metal. The grooves 35 arranged close to one another in the zones 34 surrounding the slots 32 promote the spread of the solder contained in the slots 32 during its fusion.

Moreover, the solder has added to it a brazing flux which spreads along the zone 18 by means of the grooves 35 at the same time as the brazing metal.

The upper slot 32 containing the metal and the brazing flux, i.e., the slot 32 located nearest to the end of the lining 15 is at a distance of 3 mm from this end, where the lining of a steam-generator tube of a pressurized-water nuclear reactor is concerned.

Depending on the diameter of the tube and the conditions of deformation of the lining, this distance can be between 2 and 10 mm. Between this groove 32 and the end of the tube, in the immediate vicinity of this end, the lining 15 is machined to form a zone 34 having grooves 35 arranged close to one another and having a depth substantially equal to half the depth of the slot 32.

The main advantage of the process according to the invention and of the lining used to repair the tube are that they make it possible to eliminate almost completely the dead zone and the gap between the end of the lining and the tube, make it easier to carry out the operations of radial expansion of the lining in the tube, while at the same time the swaging operation can be perfectly controlled and automated, and improve the diffusion and spread of the metal and the brazing flux between the lining and the tube.

It is possible to use linings having a single slot storing brazing metal and flux or, on the contrary, several successive slots separated by zones having annular grooves, as in the example described.

The initial play between the lining and the tube must be determined to ensure that it is possible to carry out expansion and bring the lining into contact with the tube by plastic and elastic deformation, respectively, under the best possible conditions.

Other forms of machining of the end part of the lining to promote the spread of brazing metal and flux between the end part of the lining and the tube can also be conceived.

It would be possible to use not only induction-heating means to melt the brazing metal, but also Joule-effect heating means or torches, provided that the devices can be introduced into the lining and into the tube up to the zone of diametrical expansion.

Finally, the process and repair lining according to the invention can be used not only for steam generators of pressurized water reactors, but also for any steam generator comprising a bundle of tubes, the ends of which are swaged in a tube plate and which are liable to be damaged in a zone outside this tube plate.

I claim:
1. Process for the repair by lining of a tube (12) of a steam generator comprising a bundle of tubes and a tube plate (11), in which plate the tubes (12) of the bundle are rolled from an end situated at an inlet face (13) of the tube plate (11), with which plate the ends of the tube (12) are flush, up to an outlet face (14) of said plate opposed to the inlet face, the tubes penetrating into the body of the steam generator through said outlet face, said process comprising the steps of
   (a) introducing into the tube (12) to be repaired, from the inlet face (13) of the tube plate (11), a tubular lining (15) having a wall with an outside diameter smaller than the inside diameter of the tube (12) and a length greater than the thickness of the tube plate between said inlet face and said outlet face;
   (b) fastening the lining (15) by rolling of said lining in the tube (12) in a first zone (16) of the lining located at the end of said tube located at the inlet face (13) of the tube plate (11); and
   (c) fastening the lining (15) in the tube (12), in a second zone (18) of said lining located outside the tube plate (11), by radial expansion followed by brazing of the outer surface of the lining (15) on the inner surface of the tube (12);
   (d) the radial expansion of the lining (15) being carried out by arranging an expander (25) comprising rollers (26) inside the lining (15), so that the rollers (26) project beyond the end of the lining (15) in the axial direction and by rolling the wall of the lining against the internal surface of the tube, in an end part (18) of said lining opposite the end (16) rolled in the tube plate (11), so that the lining (15) undergoes permanent plastic deformation and the tube (12) undergoes elastic deformation only by radial expansion, brazing being carried out by melting a brazing metal (32) previously deposited on the outer surface of the lining (15) in its end part (18).

* * * * *